(12) United States Patent
Horner et al.

(10) Patent No.: US 6,979,257 B2
(45) Date of Patent: Dec. 27, 2005

(54) CABIN PRESSURE CONTROL METHOD AND APPARATUS USING ALL-ELECTRIC CONTROL WITHOUT OUTFLOW VALVE POSITION FEEDBACK

(75) Inventors: Darrell W. Horner, Oro Valley, AZ (US); Gerard L. McCoy, Tucson, AZ (US); Kenneth M. Gallagher, Tucson, AZ (US); Timothy C. Biss, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 21 days.

(21) Appl. No.: 10/757,124

(22) Filed: Jan. 14, 2004

(65) Prior Publication Data

US 2005/0153648 A1 Jul. 14, 2005

(51) Int. Cl.⁷ .............................................. B64D 13/00
(52) U.S. Cl. ........................................................ 454/74
(58) Field of Search ............................... 454/71, 72, 74

(56) References Cited

U.S. PATENT DOCUMENTS

| | | | |
|---|---|---|---|
| 2,585,295 A | * | 2/1952 | Baak ........................... 454/71 |
| RE23,913 E | * | 12/1954 | Baak ........................... 454/74 |
| 3,364,837 A | | 1/1968 | Schooling |
| 3,373,675 A | | 3/1968 | Best |
| 4,164,898 A | | 8/1979 | Burgess et al. |
| 4,553,474 A | | 11/1985 | Wong et al. |
| 4,989,499 A | | 2/1991 | Scoccia et al. |
| 5,186,681 A | | 2/1993 | Emmons |
| 5,201,830 A | | 4/1993 | Braswell |
| 5,297,987 A | | 3/1994 | Emmons et al. |
| 5,520,578 A | * | 5/1996 | Bloch et al. .................. 454/74 |

* cited by examiner

*Primary Examiner*—Harold Joyce
(74) *Attorney, Agent, or Firm*—Ingrassia Fisher & Lorenz

(57) ABSTRACT

A pressure control system including an inflow unit for admitting pressurized air into a cabin, an outflow unit including a motor for operating a valve to discharge air from the cabin at a predetermined rate based on an motor control signal that sets the motor speed, a control unit, and an air pressure sensor within the cabin for determining a pressure signal. The control unit receives the pressure signal and computes a pressure rate of change error signal to set the motor control signal. The outflow unit, control unit, and air pressure sensor form a feedback control loop independent of motor speed, valve speed, or valve position feedback.

20 Claims, 14 Drawing Sheets

CABIN PRESSURE CONTROL METHOD AND APPARATUS USING ALL-ELECTRIC CONTROL WITHOUT OUTFLOW VALVE POSITION FEEDBACK

BACKGROUND OF THE INVENTION

1. Field of the Invention

The present invention relates generally to pressure control systems for use in an aircraft environment, and more particularly to a cabin pressure control method and apparatus using all electric (electro-mechanical) control without outflow valve, motor speed, or position feedback.

2. Description of the Related Art

Aircraft that fly at high altitudes require a pressurized cabin to allow occupants to safely travel without wearing an oxygen mask. The pressurized cabin is a dynamic environment impacted by the various conditions placed on the aircraft from before take-off to after landing. There are many disturbances to the cabin pressurization such as the changing pressure distribution on the airframe due to ground, taxi, takeoff, landing, or flight maneuvers, or due to changing power in one or more engines that can be a source of pressurized air.

Cabin pressurization systems are of three basic architectures: pneumatic, electro-pneumatic, and all-electric (or electro-mechanical). Until recently, especially for general aviation and regional aircraft, pneumatic and electro-pneumatic systems had the advantage of lighter weight and lower cost than all-electric systems. However, pneumatic and electro-pneumatic systems are mechanically complex in nature, and can often employ motorized bellows, solenoids, torque motors, springs, orifices, and micro valves to control the position of an outflow valve. These systems require bleed air, or a vacuum source, and require tubing to be installed on the aircraft, making their installations more complex, costly, and less reliable. Further, the pneumatic and electro-pneumatic systems typically do not have as wide a dynamic control range relative to all-electric systems. This is because the air that controls these systems must be "pushed" and "pulled" through orifices to and from control chambers that control the valve position.

All-electric cabin pressure systems have many advantages including easier installation on the aircraft (no tubes, vacuum sources, etc.) and a greater dynamic response bandwidth for cabin pressure control when compared with pneumatic or electro-pneumatic systems. However, these all-electric systems were previously quite expensive and heavy because they require sophisticated motor/valve control electronics and motor and/or actuator/valve speed/position feedback to close the control loops. In these systems, the motors would typically have tachometers, hall-effect sensors, resolvers, or some other sensing means of providing feedback to indicate the position of the outflow valve or the amount of aperture opening. In some systems, the outflow valves must have potentiometers, a rotary variable differential transformer (RVDT), which converts angular mechanical displacement into an electrical output, or a linear variable differential transformer (LVDT), which converts linear mechanical displacement into an electrical output to provide valve position feedback. These components can be bulky and expensive.

Low cost aircraft require lower cost and lighter weight cabin pressure control systems to enable aircraft manufacturers to meet level price and performance targets. Further, the smaller aircraft tend to have a smaller pressurized cabin volume, making pressure control even more difficult. Therefore, the conventional approach of using complex pneumatic, or electro-pneumatic pressure control systems is neither efficient nor cost effective, especially when applied to smaller cabin volumes.

Thus, it should be appreciated that there is a need to provide a cost-effective, light-weight, and efficient cabin pressure control system. The present invention fulfills this need as well as others.

SUMMARY OF THE INVENTION

The invention relates to a pressure control system for use with a pressurized aircraft cabin or other similar environment. In particular, and by way of example only, one embodiment of the invention is a pressure control system including an inflow unit, an outflow unit, a cabin pressure sensor unit, an ambient pressure sensor unit, and a control unit. The inflow unit admits pressurized air into a cabin. Under the direction of the control unit, the outflow unit controllably discharges pressurized air from the cabin at a predetermined rate to achieve a desired infra-cabin pressure.

The cabin pressure sensor unit is placed within the cabin in order to determine the actual pressure within the cabin. The cabin pressure sensor unit outputs a cabin pressure measurement level signal representing the intra-cabin air pressure to the control unit. The control unit receives the cabin pressure level signal from the cabin pressure sensor unit and computes a cabin pressure level rate of change signal by sampling at a first predetermined rate with a period of about 5 milliseconds. Alternatively, the cabin pressure level rate of change can be calculated via analog electronics or a suitably programmed digital processor. The control unit computes a desired cabin pressure value as a commanded pressure level signal and also a commanded pressure level rate of change signal by sampling at a second predetermined rate with a period of about 50 milliseconds.

The control unit compares the cabin pressure level rate of change signal with the commanded pressure level rate of change signal to determine a pressure rate of change error signal by sampling at a third predetermined rate with a period of about 5 milliseconds. The control unit outputs an outflow control signal to the outflow unit based on the cabin pressure rate of change error signal in order to alternately increase or decrease the rate of air discharge through the outflow unit. The outflow unit preferably includes a motor and a valve. The outflow unit increases or decreases the rate of air discharge by incrementally opening or closing the valve. The cabin pressure sensor unit, the control unit, and the outflow unit form a feedback control loop based on the intra-cabin pressure. Feedback regarding the valve, motor speed, or position of the valve or the opening of the aperture in the outflow unit is not used in the feedback control loop to determine an operating point.

Mode logic describes the operating parameters and protocols of the pressure control system given the state of the aircraft and user control inputs. The mode logic interfaces with the aircraft flight systems, including the ambient pressure sensor, ground or flight sensors, throttle position sensors, doors open/closed sensors, and equipment which provides flight parameters and determines what the cabin pressure should be for a given aircraft operating condition. Example flight parameters can be the top of climb, time to climb, time to landing, and the landing field elevation, etc. The cabin pressurization protocol determines the desired cabin pressure for a given set of conditions within a particular automatic or manual operating mode.

When the aircraft is on the ground, the mode logic indicates the cabin should be completely depressurized to allow for easy opening and closing of cabin doors, to prevent pressure "bumps" on the occupant's ears when the doors are closed, and during pre-flight testing of the pressure control system, for example. The mode logic communicates with the aircraft systems through discrete and/or analog interfaces and/or via a communications data bus such as an Aeronautical Radio, Inc. (ARINC) 429 standard interface. ARINC 429 is a specification which defines how avionics equipment and systems should communicate with each other.

At takeoff, the cabin should be pressurized slightly to prevent a sudden pressure increase during rotation, when the aircraft nose-gear leaves the runway prior to lift-off of the main gear. During this dynamic 2–3 second maneuver, the airframe pressure distribution is changed which causes changes in the local pressure at the outflow valve exhaust. These pressure changes can affect the cabin air exhaust flow rate and temporarily affect the pressure within the cabin. Prior to lift-off, it is desirable to initiate the pressure control system to stabilize dynamic control prior to the onset of these disturbances. The pressure control system can be initiated by the take-off throttle switch input, or when the mode logic detects the aircraft taxi speed is greater than about 9 knots (Nautical miles per hour), for example.

During flight, the mode logic senses the actual aircraft altitude and determines an effective cabin altitude by determining a commanded pressure level for the cabin. The mode logic can control the effective cabin altitude according to a predetermined climb or descent schedule, or to the selected landing field elevation, whichever is highest. Preferably, the climb and descent schedule will be limited to a slew rate of +500 feet per minute for climb, and –300 feet per minute for descent. During flight, an effective maximum altitude of approximately 8,000 feet is used as an upper limit for the effective altitude of the cabin. Upon landing, the control system will depressurize the cabin at ±500 feet per minute until the valves are fully open to allow cabin door opening.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Systems and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first one or two digits of each reference number indicate the figure in which the element first appears, while the last two digits distinguish the element within the figure.

Figure 1:
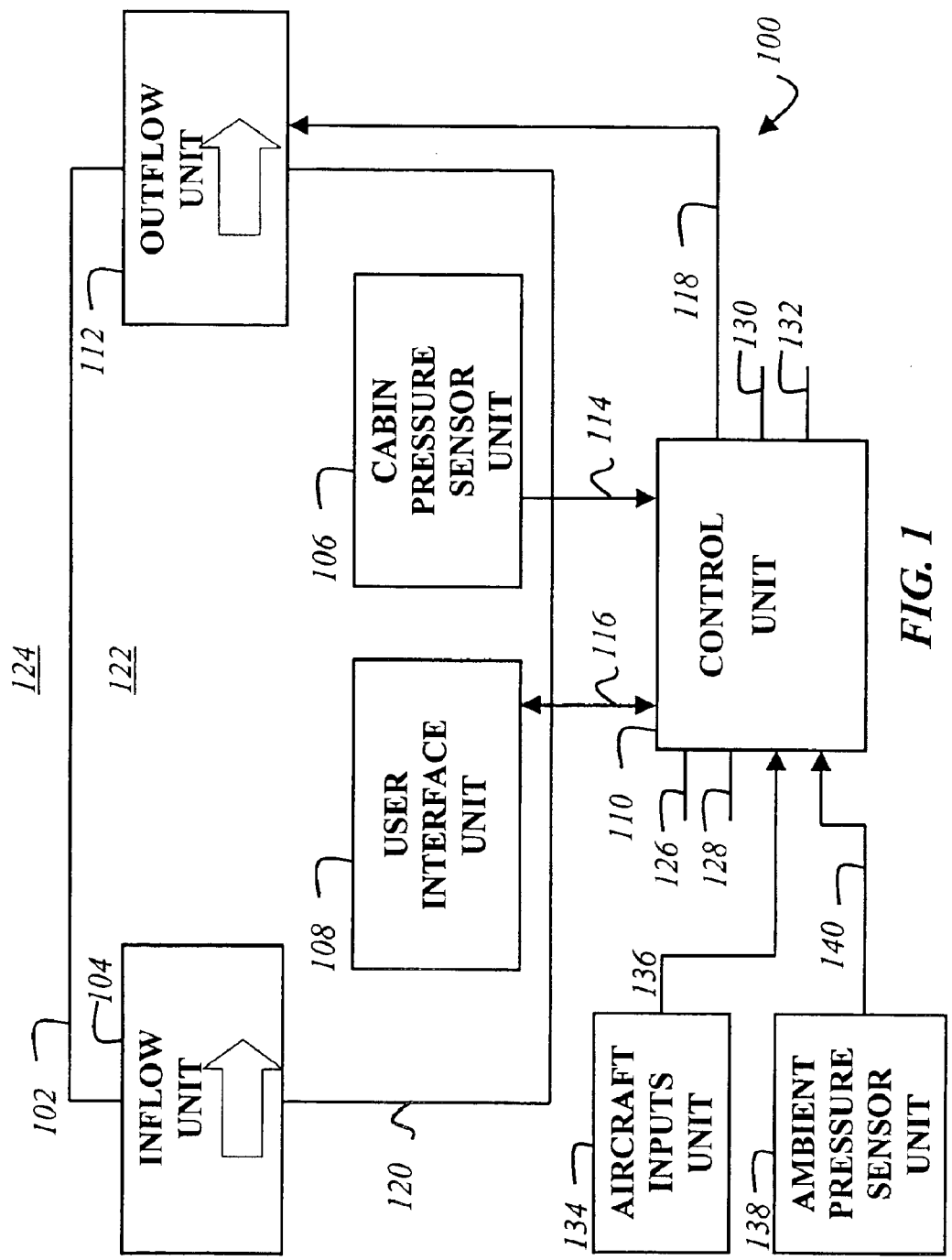
FIG. 1 is a block-level diagram of a pressure control system in accordance with an embodiment of the present invention.

Referring now more particularly to the drawings. FIG. 1 is a block-level diagram of a pressure control system 100. The pressure control system 100 operates with a pressurized environment like a cabin 102 of an aircraft that includes an inflow unit 104 to admit pressurized air into the cabin 102. The pressure control system 100 functions to controllably discharge pressurized air from the cabin 102 in order to maintain a desired pressure within the cabin 102.

The pressure control system 100 includes a cabin pressure sensor unit 106, a user interface unit 108, a control unit 110, an aircraft inputs unit 134, an ambient pressure sensor unit 138, and an outflow unit 112. The cabin pressure sensor unit 106 measures the actual absolute pressure within the cabin and produces a cabin pressure level signal 114 indicating an actual pressure measurement value. The user interface unit 108 displays the actual cabin altitude, the actual cabin-to-ambient differential pressure, and the actual cabin altitude rate-of-change to a user as well as allows commands from a user to select the manual or automatic cabin pressure and dump controls. The user interface unit 108 outputs user commands selecting manual and automatic operation of the pressure control system 100 to the control unit 110.

The user interface unit 108 receives and sends user interface signals 116. A person of skill in the art would understand that the user interface unit 108 can comprise multiple functions other than those listed, including but not limited to: selection and indication of the landing field elevation, display of warnings, cautions, and advisories, other indications, aid other semi-automatic or manual control inputs. Further, it is understood that this user interface unit 108 can be embodied in any number of embodiments of controls and indications and in any number of locations or physical partitioning within the aircraft. Further, these functions can be automated and/or interfaces with avionics systems to provide the user interface signals 116.

The control unit 110 receives the cabin pressure level signal 114 and computes a cabin pressure level rate of change by sampling at a first predetermined rate with a period of about 5 milliseconds. Alternatively, the pressure level rate of change can be calculated via analog electronics or a suitably programmed digital processor. Further, other embodiments may utilize a dedicated rate sensor, separate from the cabin pressure sensor unit 106, to provide a cabin pressure level rate of change signal 130 to the control unit 110 in addition to the cabin pressure level signal 114. The ambient pressure unit 138, the cabin pressure sensor unit 106, and the user interface unit 108 may all be located within or adjacent to the control unit 110, or these functions may be partitioned in a number of ways. The control unit 110 may be located inside or outside of the pressurized cabin 102, along with any of the functional elements of this system. A person of skill in the art will understand that the functional elements described in this specification are given as functional identities and can be implemented in a number of ways.

The cabin pressure level rate of change signal 130 corresponds to a differentiation of the cabin pressure level signal 114 to determine the rate of change over time, and can be a positive rate of change for an increasing cabin pressure over time, or can be a negative rate of change for a decreasing cabin pressure over time. Similarly, the control unit 110 computes a commanded pressure level signal 126 and a commanded pressure level rate of change signal 128 based on sampling at a second predetermined rate with a period of about 50 milliseconds. The commanded pressure level signal 126 and the commanded pressure level rate of change signal 128 are computed from mode logic that is dependent on the aircraft inputs unit 134 that provides an aircraft inputs signal 136, and the ambient pressure sensor unit 138 that provides an ambient pressure signal 140.

The cabin pressure level rate of change signal 130 and the commanded pressure level rate of change signal 128 are compared to determine a cabin pressure level rate of change error signal 132 at a third predetermined rate with a period of 5 milliseconds. The control unit 110 produces an outflow control signal 118 based on the cabin pressure level rate of change error signal 132 for discharging the pressurized air from the cabin 102 through the outflow unit 112. The outflow control signal 118 includes one or more motor control signals.

The inflow unit 104 provides pressurized air to the cabin 102 and should be located outside the cabin 102. Alternatively, the inflow unit 104 may be located inside the cabin, or mounted to span a bulkhead 120 that separates the cabin 102 from the ambient environment. The bulkhead 120, also called a pressure bulkhead, separates the pressurized cabin 102 at an intra-cabin pressure 122 from the ambient pressure 124 outside the cabin 102. The outflow unit 112 is mounted to span a bulkhead 120 of the cabin 102.

The control unit 110 computes the outflow control signal 118 and outputs the outflow control signal 118 to the outflow unit 112 based on the pressure level rate of change error signal 132 in order to alternatively increase or decrease the rate of air discharge through the outflow unit 112. The outflow unit 112 preferably includes a motor and a valve. The outflow unit 112 increases or decreases the rate of air discharge by incrementally opening or closing the valve. The cabin pressure sensor unit 106, the control unit 110, and the outflow unit 112 form a feedback control loop with the feedback being the intra-cabin pressure 122 as detected by the cabin pressure sensor unit 106. No valve/motor speed, or actuator/valve position is used as feedback in the infra-cabin pressure control loop.

Figure 2:
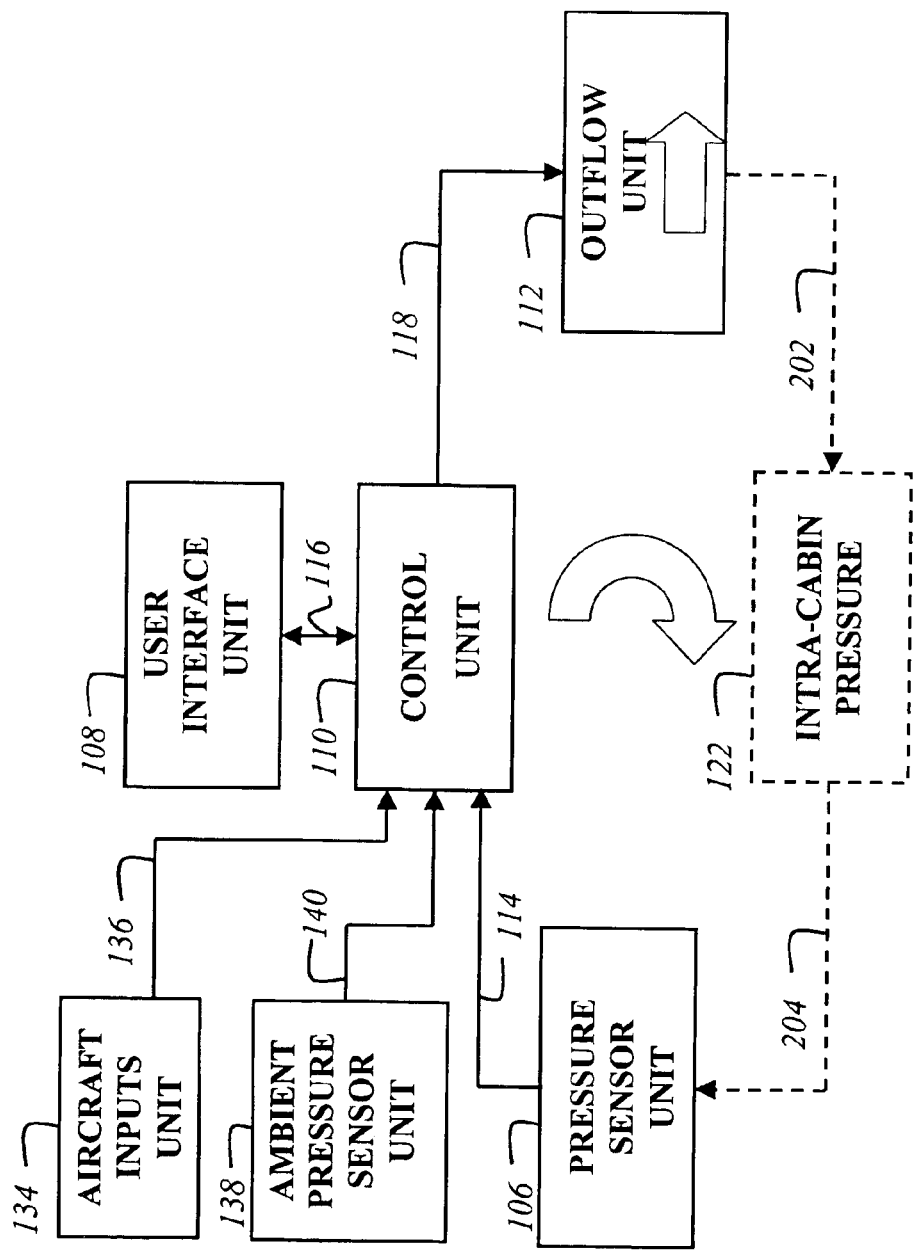
FIG. 2 is a block-level diagram showing the outer control loop formed by the control unit, the outflow unit, the intra-cabin pressure, and the cabin pressure sensor unit in accordance with an embodiment of the present invention.

In reference to FIG. 2, a control loop is formed with the cabin pressure sensor unit 106, the control unit 110, the outflow unit 112, and the intra-cabin pressure 122. The cabin pressure sensor unit 106 detects the actual pressure within the cabin 102 and outputs a cabin pressure level signal 114 to the control unit 110. The control unit 110 receives the cabin pressure level signal 114 and produces the outflow control signal 118 for selecting a predetermined rate for discharging the pressurized air from the cabin 102 through the outflow unit 112. The commanded cabin pressure level signal 126 and the commanded pressure level rate of change signal 128 are based on the mode logic that uses input signals from the aircraft inputs unit 134, the ambient pressure sensor unit 138, and the user interface unit 108.

By discharging more, or alternatively discharging less, pressurized air from the cabin 102, the outflow unit 112 creates a cabin pressure change effect 202 on the intra-cabin pressure 122. The changing intra-cabin pressure 122 creates a sensor pressure change effect 204 on the cabin pressure sensor unit 106. Thus, the loop is closed where the control unit 110 drives a change in the intra-cabin pressure and the intra-cabin pressure 122 is sensed by the control unit 110. An assumption is that the inflow unit 104 will continue admitting pressurized air independently from the operation of the control unit 110 or outflow unit 112. It is further assumed that the inflow unit 104 will admit pressurized air into the cabin at a reasonably steady rate. Of course, as mentioned before, some variation is tolerable and expected due to changes in the source of the pressurized air such as changing the power of an engine, for example. These variations are expected to be within the capacity of the feedback control loop to compensate.

Figure 3:
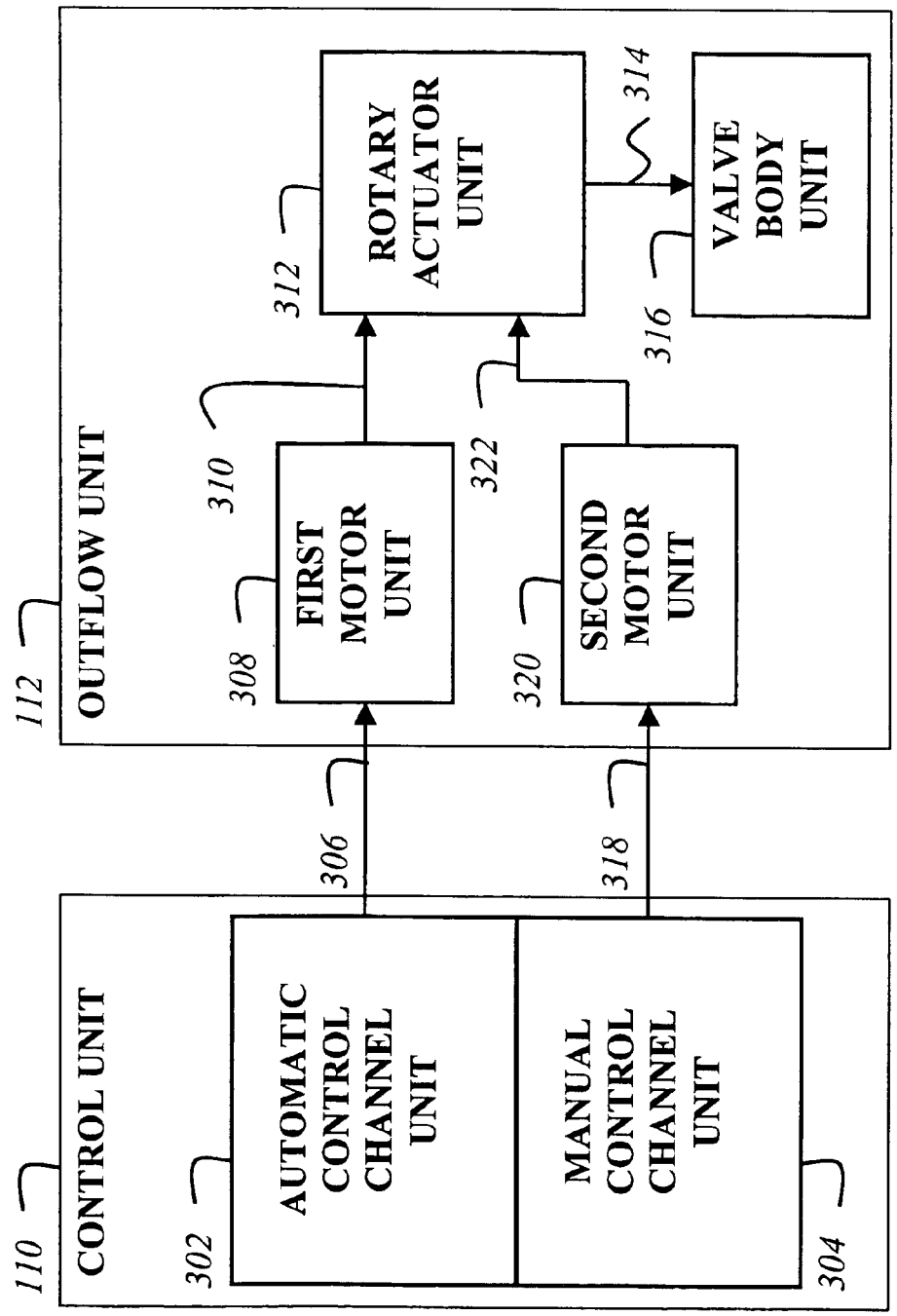
FIG. 3 shows more detailed block diagrams of the control unit and the outflow unit in accordance with an embodiment of the present invention.

In reference to FIG. 3, the control unit 110 includes an automatic control channel unit 302 as well as a manual control channel unit 304. The automatic control channel unit 302 outputs an automatic outflow control signal 306 that is applied to a first motor 308 in the outflow unit 112. The first motor 308 is preferably a brushed DC motor that self commutates when voltage is applied. Alternatively, the first motor 308 can be a single phase inductive AC current motor with a "steering" capacitor across its clockwise-counterclockwise rotor windings, a brushless DC type, a stepper type, a switched reluctance type or any other motor type that can be controlled without using motor speed feedback.

The automatic outflow control signal 306 causes the first motor 308 to rotate in a first direction or a second direction (forward or reverse direction) in order to apply a first rotary driving force 310 to a first mechanical input of a rotary actuator unit 312. The manual control channel unit 304 outputs a manual outflow control signal 318 that is applied to a second motor unit 320 in the outflow unit 112. The second motor unit 320 applies a second rotary driving force 322 to a second mechanical input of the rotary actuator unit 312. A person of skill in the art will understand that the manual control unit can have several embodiments, including but not limited to the electro-mechanical means, electro-pneumatic means, or all-pneumatic means. However, the manual control channel unit 304 should be capable of disabling and/or overriding the automatic control channel unit 302.

The rotary actuator unit 312 applies a third rotary driving force 314 to a valve within a valve body unit 316. The rotary actuator unit 312 includes a first motor unit 308, a second motor 320, and a gearbox assembly (not shown) that acts to transmit rotary movement alternately from the first motor unit 308 and the second motor unit 320 to the valve body unit 316. The automatic outflow control signal 306 and the manual outflow control signal 318 are included in the outflow control signal 118. In an alternative embodiment, a plurality of automatic control channel units 302 each providing an automatic outflow control signal 306 can be applied to one or more first motor units 308 to provide system redundancy and backup capability in case of failure.

In reference to FIGS. 4A–4B and 5A–5B, the rotary actuator unit 312 mechanically drives the valve body unit 316 to open and close a valve assembly within the valve body unit 316. The third rotary driving force 314 rotates alternately in a first and a second direction (forward or reverse direction) under the control of the control unit 110 to incrementally open and close the valve assembly. Thus, the first motor unit 308 and the second motor unit 320 can each operate the valve assembly to open and close the valve under the direction of the control unit 110. The first motor unit 308 and the second motor unit 320 each have motors that operate at a predetermined speed in the forward or reverse directions.

Figures 4A, 4B:
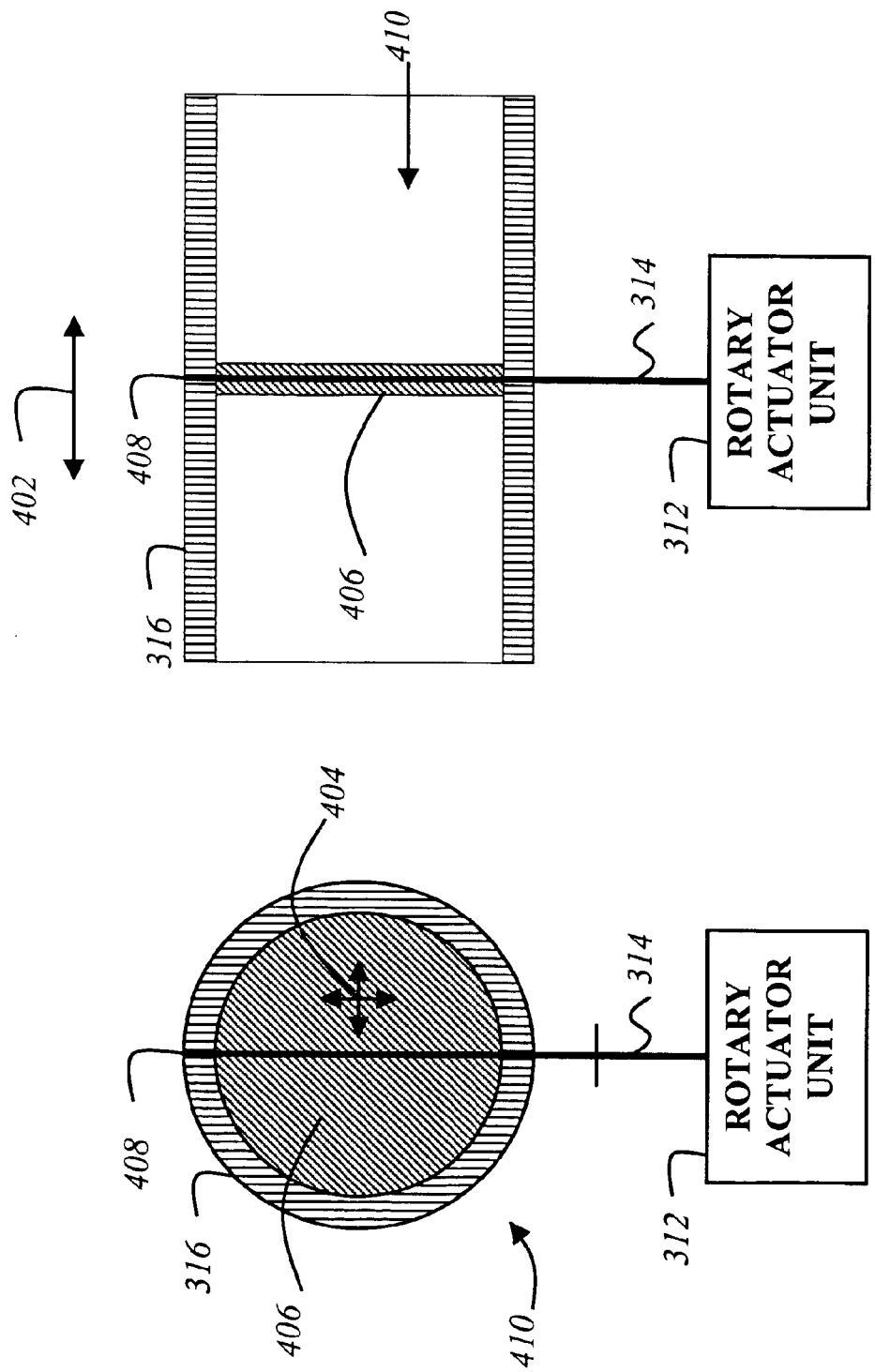
FIGS. 4A–4B show a amplified diagram of the valve body unit and rotary actuator unit when the butterfly outflow valve assembly is closed in accordance with an embodiment of the present invention.

FIGS. 4A–4B show the valve body unit 316 with the valve assembly in a closed position that inhibits air flow through the valve body unit 316. Since the motors drive the valve body unit 316 through the rotary actuator unit 312, the motor speed determines the opening and closing valve speed and the valve position. Hence, feedback regarding the motor speed is functionally equivalent to feedback regarding the valve speed and the valve position.

Figure 5B:
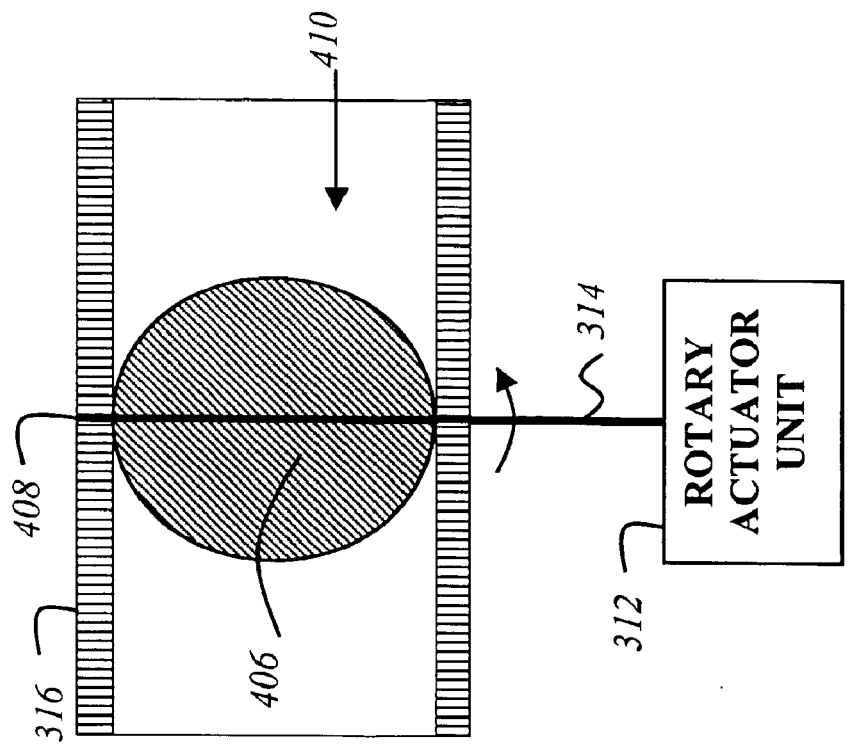
FIGS. 5A–5B show a simplified diagram of the valve body unit and rotary actuator unit when the butterfly outflow valve assembly is open in accordance with an embodiment of the present invention.
Figure 5A:
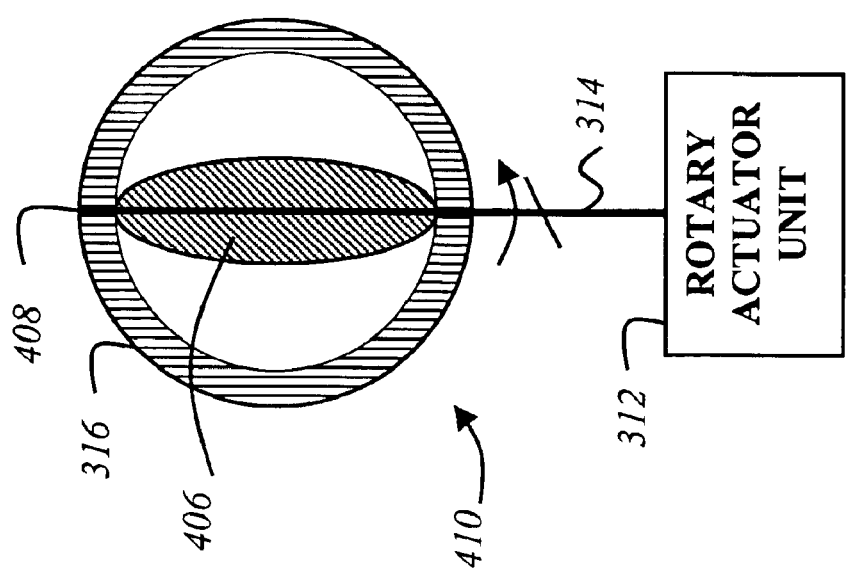

FIGS. 5A–5B, show the valve body unit 316 with the valve assembly in an open position that permits air flow through the valve body unit 316. The valve body unit 316 may be operated so that the valve assembly maintains a position between and including the boundary conditions of completely closed to completely open. The valve body unit 316 may provide feedback regarding these boundary conditions to the control unit 110 as a motor shutoff signal or as a safety factor, and not as feedback regarding the operating point or the control level of the feedback control loop.

The outflow valve assembly includes a duct that is defined by a bore 402 and a cross-sectional area 404. The bore 402 is substantially parallel to the long axis of the duct and can be closed by a circular plate 406 attached to an outflow valve rotating member 408 disposed across a cross-sectional diameter of the bore 402 included in a butterfly outflow valve assembly 410. The butterfly outflow valve assembly 410 is closed when the butterfly outflow valve rotating member 408 rotates in a second direction to a point up to and including where the cross-sectional area 404 of the bore 402 is maximally obstructed by the circular plate profile.

FIGS. 5A–5B show the butterfly outflow valve assembly 410 is opened when the outflow valve rotating member 408 rotates in a first direction to a point up to and including where the cross-sectional area of the bore 402 is minimally obstructed by the circular plate 406 profile. In one embodiment, the cross-sectional area of the bore 402 should be approximately 5.4 in$^2$. Feedback regarding the position of the butterfly outflow valve rotating member 408 or the circular plate 406 within the butterfly outflow valve assembly 410 is not typically used to determine an operating point in the feedback control loop shown in FIG. 2. A person of skill in the art would recognize that the outflow unit 112 described in thus specification is only one possible embodiment, and that other embodiments are considered within the scope of this disclosure as long as the outflow unit 112 can be driven electro-mechanically. Similarly, the term valve can include a butterfly valve assembly or some other aperture that can incrementally open and close to selectively control the rate of airflow through the outflow unit.

Figure 6:
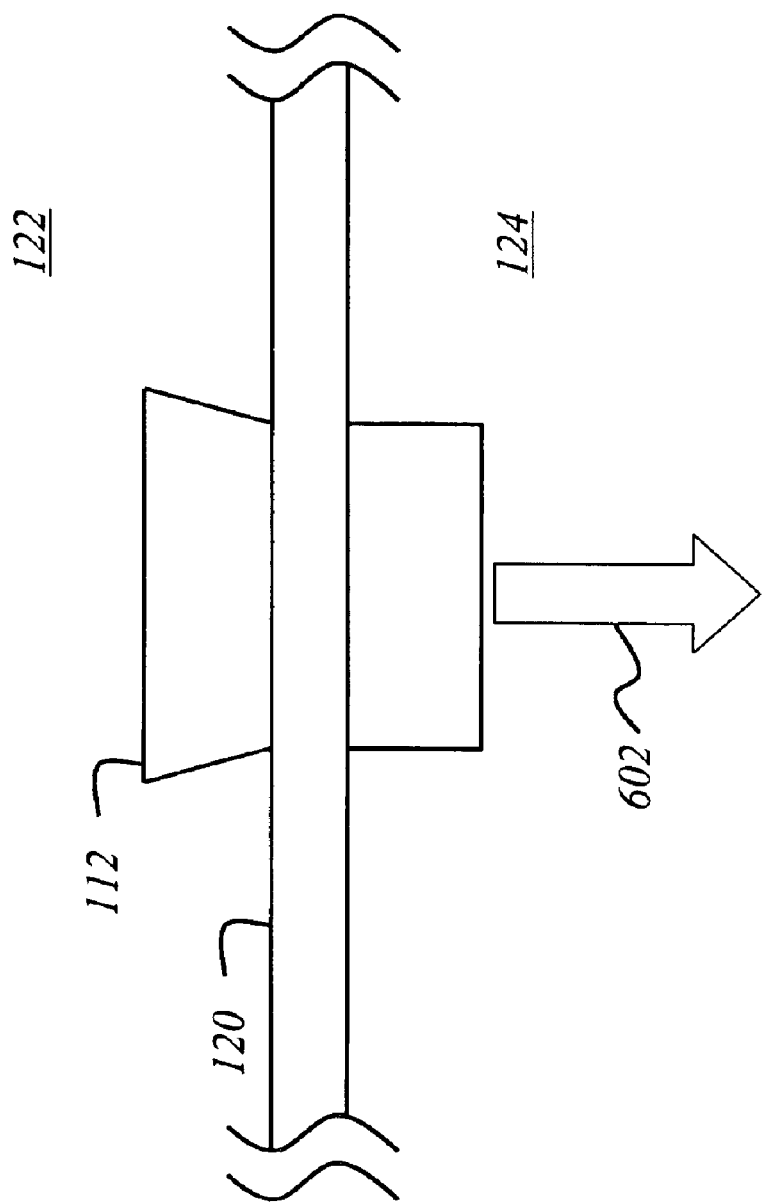
FIG. 6 is a view of a portion of the cabin bulkhead with the outflow unit positioned through the bulkhead in accordance with an embodiment of the present invention.

FIG. 6 shows the outflow unit 112 positioned to traverse a pressure bulkhead 120 that separates the pressurized cabin 122 from the ambient pressure 124 in the space outside the pressurized cabin. The outflow unit 112 regulates the pressurized air outflow 602 out of the outflow unit 112 by maintaining an effective opening area that permits a predetermined outflow rate. The outflow unit 112 may be placed anywhere traversing the pressure bulkhead of the cabin 102. The outflow unit 112 duct may have one or more flared or bell-shaped ends to aid in the valve exhaust efficiency or other design constraint.

No user control is required during automatic operation of the pressure control system 100. However, a person of skill in the art would recognize that user controls of many types are acceptable during automatic operation and may be utilized in various embodiments. A display is presented to a user on the flight deck indicating the actual cabin altitude (ft), the actual cabin altitude rate of change (slfpm–sea level feet per minute), the actual cabin-to-atmosphere differential pressure (psid–pounds per square inch differential), and the selected landing field elevation (ft). The displayed information may be provided directly by the cabin pressure sensor unit 106, the ambient pressure sensor unit 138, the control unit 110, additional pressure sensors in the aircraft system, or avionics that can synthesize the various sensor inputs into a meaningful format for display.

Figure 7:
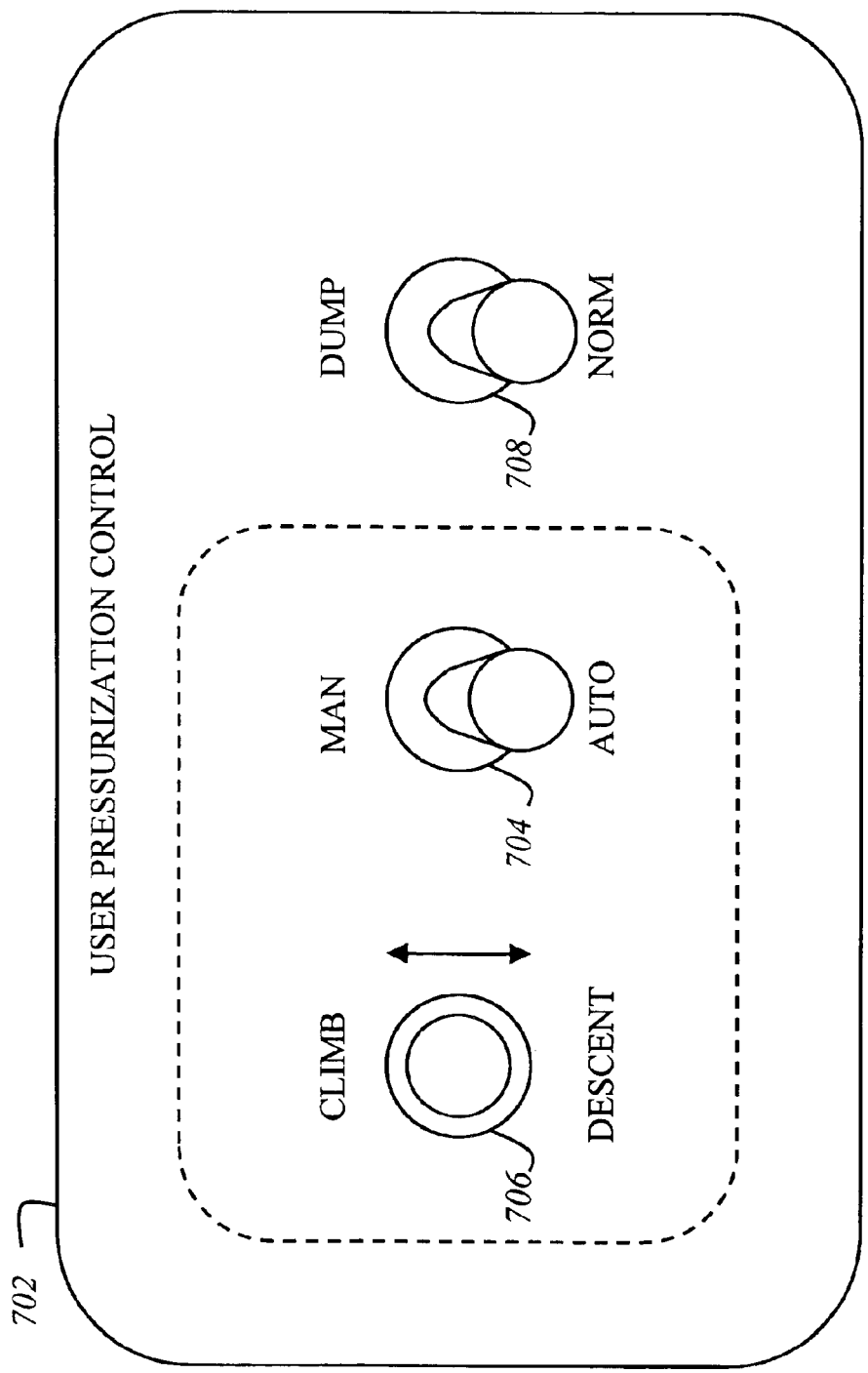
FIG. 7 shows a front view of the user interface unit control panel showing user controls in accordance with an embodiment of the present invention.

FIG. 7 shows the user pressurization control switch panel 702, which is a part of the controls portion of the user interface unit 108. Manual control of the intra-cabin pressure 122 is enabled by the operation of the pressurization control switch panel 702 located on the flight deck of the aircraft, for example. In manual operation, a user has complete control of the outflow unit 112. The user pressurization control switch panel 702 is a user interface to receive commands from a user that are used in part to override automatic control and permit manual control of the commanded pressure level signal 126 computed within the control unit 110.

The manual mode is selected with the AUTO/MAN toggle switch 704. The AUTO position is for automatic control of the intra-cabin pressure 122. MAN is for manual control of the intra-cabin pressure 122. Selecting MAN disables automatic control of the intra-cabin pressure 122. The CLIMB/DESCENT toggle switch 706 is preferably a three-way toggle switch that is spring-loaded to the center position. Within the manual mode, if the CLIMB/DESCENT toggle switch 706 is selected to CLIMB, the outflow unit 112 is driven towards the open position to permit pressurized air to escape at a higher rate. Conversely, if the CLIMB/DESCENT toggle switch 706 is selected to DESCENT, the outflow unit 112 is driven towards the closed position to permit pressurized air to escape at a lower rate. The DUMP/

NORM toggle switch 708 is used to command the outflow unit 112 to an open position. The cabin altitude limitation overrides the DUMP command when the cabin exceeds the altitude-limit threshold of approximately 15,000 feet to avoid the negative affects of hypoxia. Manual operation of the pressure control system 100, including the use of the dump operation, disables the automatic mode.

Figure 8:
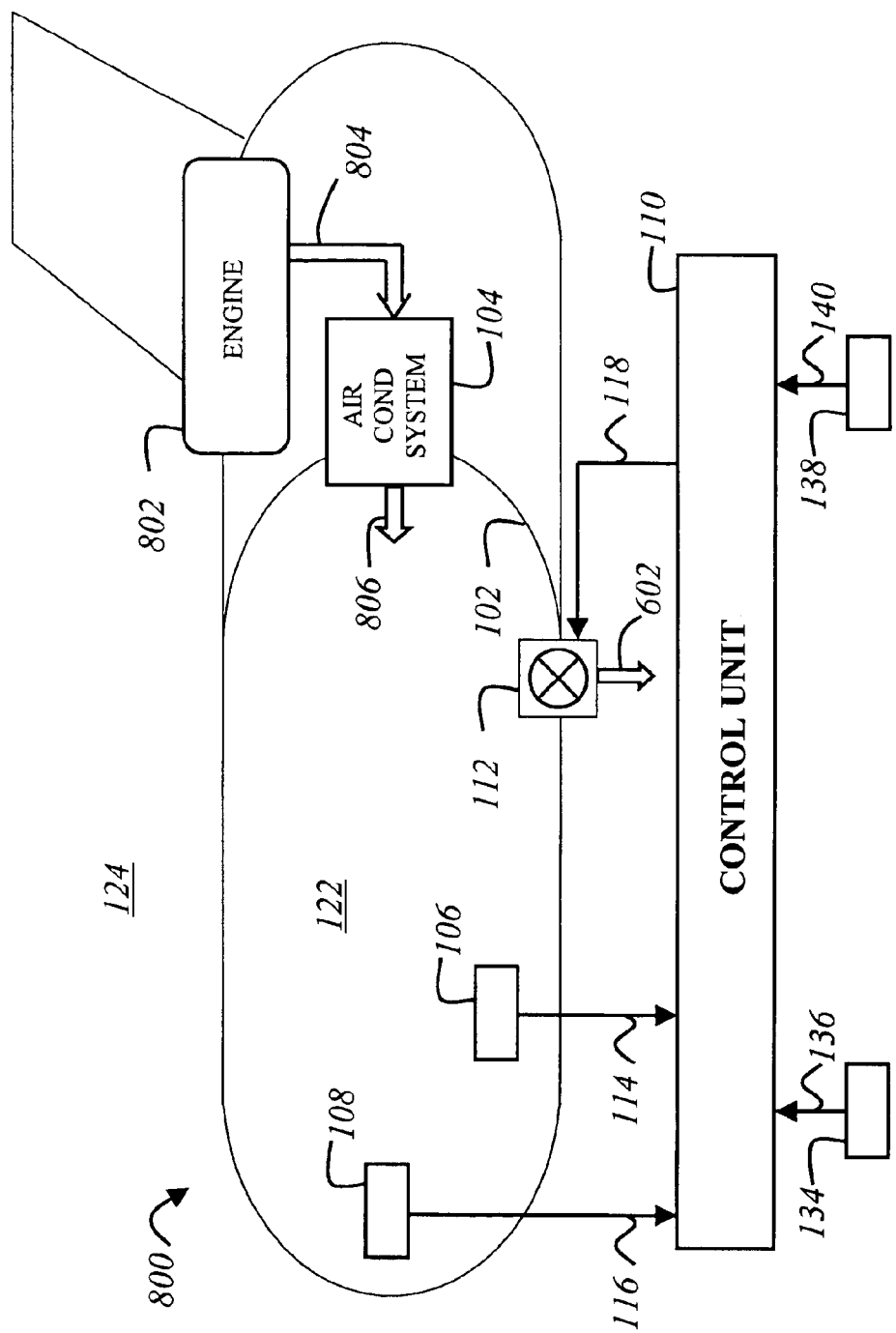
FIG. 8 shows an abstracted view of the control system elements of the pressure control system in accordance with an embodiment of the present invention.

FIG. 8 shows an embodiment of the present invention in the environment of an aircraft 800 including the pressurized aircraft cabin 102 with the intra-cabin pressure 122 and the ambient pressure 124 outside the cabin 102. The aircraft 800 includes at least one engine 802 that feeds a source of raw pressurized air 804 to an air conditioning unit, which is an inflow unit 104, to supply pressurized air 806 to the cabin 102. The air conditioning unit can filter impurities from the air and control the temperature of the pressurized air 806.

The control laws of the pressure control system are based on a novel approach using a modified version of the well known Ideal Gas Law (IGL). The cabin pressure (Pc) is a function of the cabin volume (V), the amount of air mass (m), and the temperature (T). This may be expressed arithmetically as:

$$Pc*V=m*R*T \quad \text{(Equation 1)}$$

where R is the gas constant.

If Equation 1 is differentiated with respect to time, the cabin pressure rate of change (Pc') is a function of the change in air mass (m') with respect to time. This may be expressed arithmetically as:

$$Pc'=m'(R*T)/V \quad \text{(Equation 2)}$$

This change in air mass m' is the difference between the mass rate of air in ($W_{in}$) and the mass rate of air out and ($W_{OUT}$), may be expressed arithmetically as:

$$m'(W_{in}-W_{out}) \quad \text{(Equation 3)}$$

The $W_{out}$ term is controlled by the pressure control system 100.

$W_{out}$ is a function of the cabin pressure (Pc), the temperature (T), the pressure ratio change (drop) across the valve assembly from the intra-cabin pressure 122 to the ambient pressure 124 outside the cabin 102, and the cross-sectional area of the valve (A). This may be expressed arithmetically using Smith's equation:

$$W_{out}=(K*Cd*A*P_{in}N)/T^{1/2} \quad \text{(Equation 4)}$$

K is a constant 15.629 for units of pounds per minute inches of Mercury (Hg), and degrees Rankine (° R). Cd is the discharge coefficient of the valve, using the pressure ratio change (drop) across the valve assembly when plotted against a Cd curve or determined by a formula. A is the area of the valve outlet in square inches. Pin is the inlet (high-side) pressure, indicated by the intra-cabin pressure 122, in units of inches Hg absolute.

A simplifying assumption is that the total pressure is equal to the inlet pressure for an outflow valve application. N is the isentropic coefficient for air, found using standard tables or formula, with the pressure ratio (drop) across the valve (r) as an input. Finally, T is the inlet temperature ° R, where ° R=459.69+° F. A temperature sensor is not typically used since an average temperature maybe assumed in order to fall within an acceptable range allowing the control system to compensate for any error associated with this assumption.

FIG. 8 is a diagram showing an embodiment of the control unit 110 and what follows is a description of some of the high-level functions implemented by the control unit 110. The cabin pressure sensor unit 106 within the cabin 102 detects the actual cabin pressure 122 and produces a cabin pressure level signal 114. The user interface 108 supplies user interface signals 116 to the control unit 110 for manual or automatic control or dump. The aircraft inputs unit 134 and ambient pressure sensor unit 138 provide inputs for use in determining the commanded cabin pressure and pressure rate limits.

From a high-level perspective, the control unit 110 has at least a first and a second control loop. The first control loop, referred to as the outer control loop, controls the cabin pressure to desired levels. Based on the difference between the commanded cabin pressure and the actual cabin pressure, a commanded cabin pressure rate of change is generated.

The second control loop of control unit 110, referred to as the inner control loop, controls the cabin pressure rate of change to comfortable limits while the cabin pressure is changing. Based on the difference between the commanded cabin pressure rate-of-change and the actual cabin pressure rate-of-change, an outflow control signal 118 is applied to the outflow control unit 112. Additional details of the control unit 110 functionality are provided in FIGS. 9 and 11 along with the following discussion regarding fix cabin pressure rate of change error signal. The cabin pressure rate of change error signal is scaled and converted by a scaling and converting block to produce the outflow control signal 118 that is applied to the outflow control unit 112.

Figure 9:
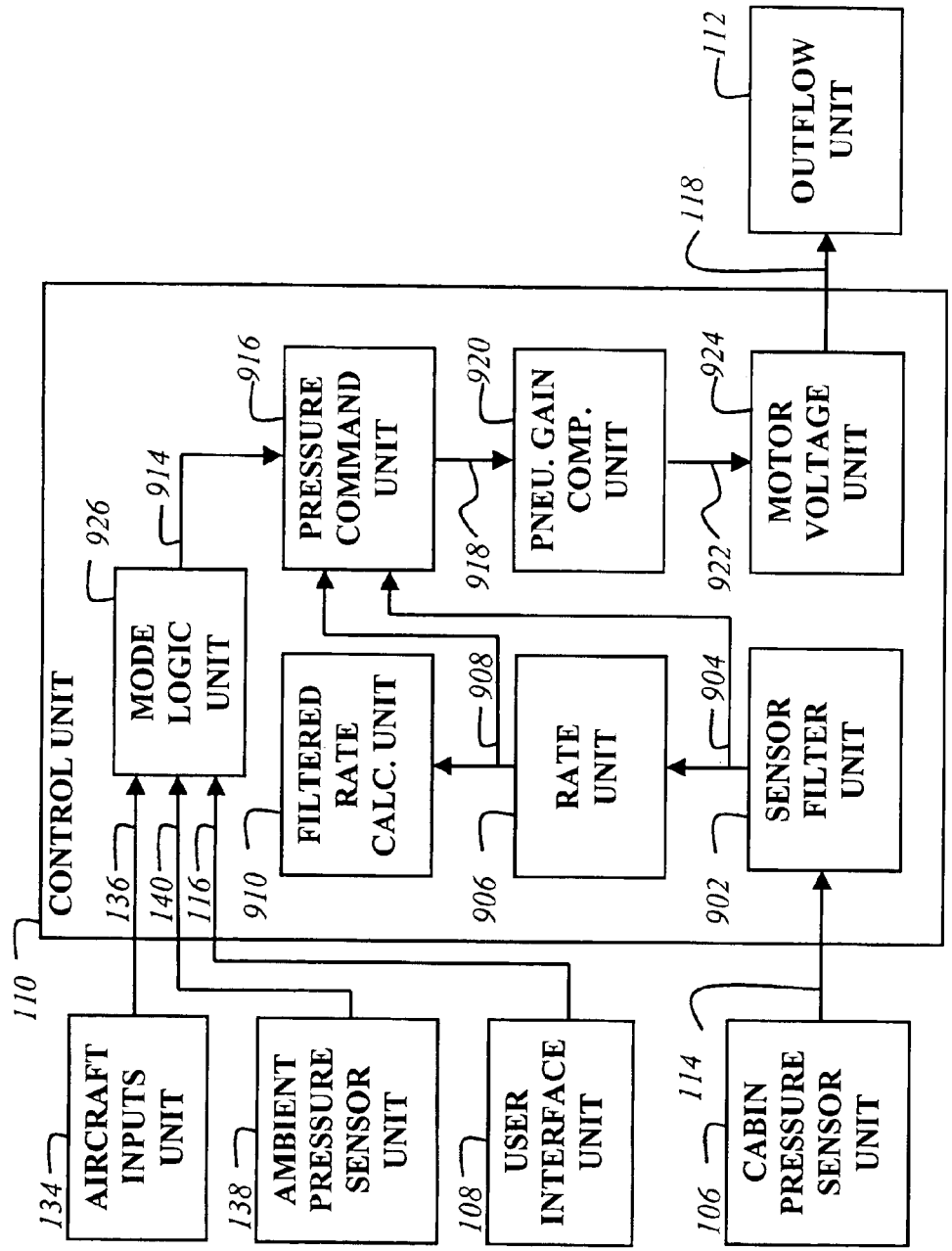
FIG. 9 is a more detailed block diagram of the control unit showing the interconnections of the sub-blocks in accordance with an embodiment of the present invention.

FIG. 9 shows another embodiment of the control unit 110 including more detailed functional units. The control unit 110 includes a sensor filter unit 902, a rate unit 906, a filtered rate calculation unit 910, a pressure command unit 916, a pneumatic gain compensation unit 920, a motor voltage unit 924, and a mode logic unit 926. The control unit 110 receives inputs from the aircraft inputs unit 134, the ambient pressure sensor unit 138, and the cabin pressure sensor unit 106. The sensor filter unit 902 receives the cabin pressure level signal 114 and outputs a filtered cabin pressure level signal 904. The filtered cabin pressure level signal 904 is applied to both the rate unit 906 and the pressure command unit 916. The rate unit 906 receives the filtered cabin pressure level signal 904 and produces a sensed cabin pressure rate of change signal 908. The sensed cabin pressure rate of change signal 908 is applied to the filtered rate calculation unit 910 and the pressure command unit 916.

The filtered rate calculation unit 910 receives the sensed cabin pressure rate of change signal 908 and produces a filtered cabin pressure rate of change that can be displayed to a user for informational purposes. The mode logic unit 926 generates a commanded pressure level signal 914. The pressure command unit 916 produces a cabin pressure rate of change error signal 918 based on the difference between the commanded and actual cabin pressure rates. The pneumatic gain compensation unit 920 multiplies the cabin pressure rate of change error signal 918 by a pneumatic gain value to produce a scaled duty cycle command signal 922. The motor voltage unit 924 receives the scaled duty cycle command signal 922 and generates a voltage to be applied to the motor windings as a part of the outflow control signal 118.

Figure 10:
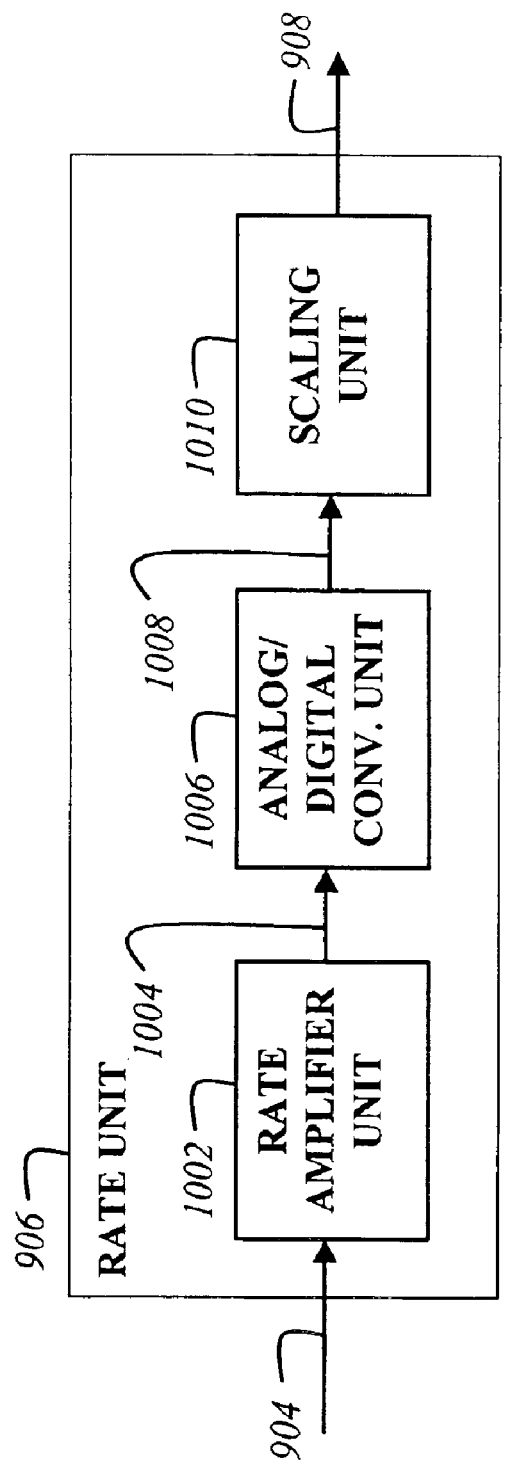
FIG. 10 shows the sub-blocks of the control unit comprising the rate unit in accordance with an embodiment of the present invention.

In reference to FIG. 10, the rate unit 906 includes a rate amplifier unit 1002, an analog-to-digital converter (ADC) unit 1006, and a scaling unit 1010. The rate amplifier unit 1002 receives the filtered cabin pressure level signal 904 and produces a differentiated and filtered cabin pressure rate signal 1004. The analog analog-to-digital converter (ADC) unit 1006 receives the differentiated and filtered cabin pressure rate signal 1004 and produces a digitized cabin pressure rate signal 1008. A scaling unit 1010 receives the digitized cabin pressure rate signal 1008 and produces a sensed cabin pressure rate of change signal 908.

Figure 11:
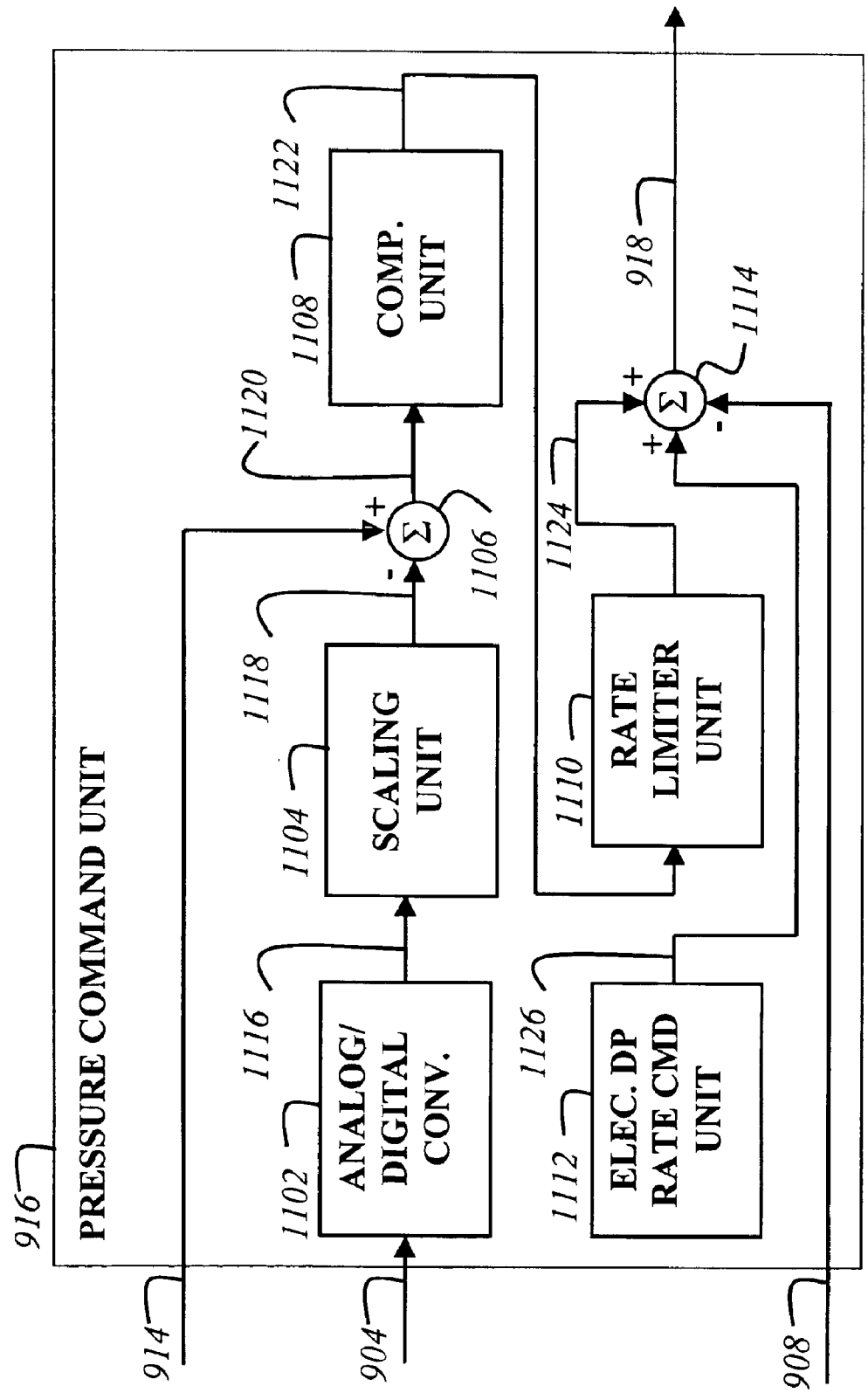
FIG. 11 shows the sub-blocks of the control unit comprising the pressure command unit in accordance with an embodiment of the present invention.

In reference to FIG. 11, the pressure command unit 916 includes an analog-to-digital conversion unit 1102, a scaling unit 1104, a first summing unit 1106, a compensation unit 1108, a rate limiter unit 1110, an electronic DP rate command unit 1112, and a second summing unit 1114. The analog-to-digital conversion unit 1102 receives the filtered cabin pressure level signal 904 and produces a digital filtered cabin pressure level signal 1116. The scaling unit 1104 receives the digital filtered cabin pressure level signal 1116 and produces a scaled filtered cabin pressure level signal 1118.

The scaled filtered cabin pressure level signal 1118 is subtracted from the commanded pressure level signal 914 in the first summing unit 1106 to produce a cabin pressure error signal 1120. The compensation unit 1108 receives the cabin pressure error signal 1120 and produces a commanded cabin pressure rate signal 1122. The rate limiter unit 1110 receives the commanded cabin pressure rate signal 1122 and produces a limited commanded cabin pressure rate signal 1124. The electronic DP rate command unit 1112 produces an electronic DP rate command signal 1126 when the cabin-to-ambient differential pressure exceeds normal operating levels. The second summing unit 1114 sums the limited commanded cabin pressure rate signal 1124 and the electronic DP rate command signal 1126 and subtracts the sensed cabin pressure rate of change signal 908 to produce a pressure rate of change error signal 918.

Figure 12:
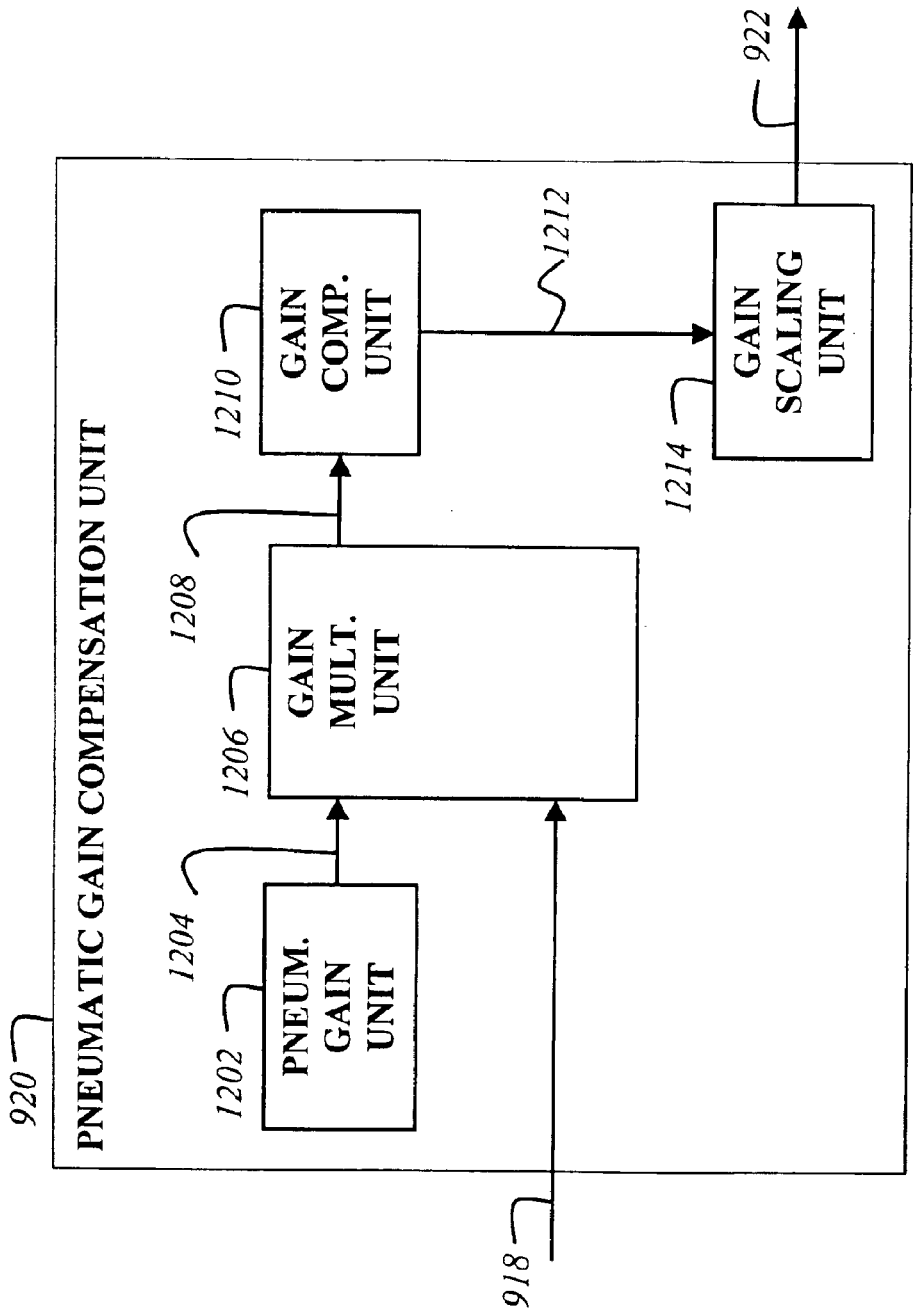
FIG. 12 shows the sub-blocks of the control unit comprising the pneumatic gain compensation unit in accordance with an embodiment of the present invention.

In reference to FIG. 12, the pneumatic gain compensation unit 920 includes a pneumatic gain unit 1202, a gain multiplier unit 1206, a gain compensation unit 1210, and a gain scaling unit 1214. The pneumatic gain unit 1202 produces a pneumatic gain signal 1204 used for compensating for varying cabin-to-ambient pressure ratio conditions. The gain multiplier unit 1206 multiplies the pneumatic gain signal 1204 by the pressure command rate of change error signal 918 to produce a gained pressure error rate signal 1208. The gain compensation unit 1210 receives the gained pressure error rate signal 1208 and produces a duty cycle command signal 1212. The gain scaling unit 1214 receives the duty cycle command signal 1212 and produces a scaled duty cycle command signal 922 for subsequent application to a motor for driving the outflow unit 112.

Figure 13:
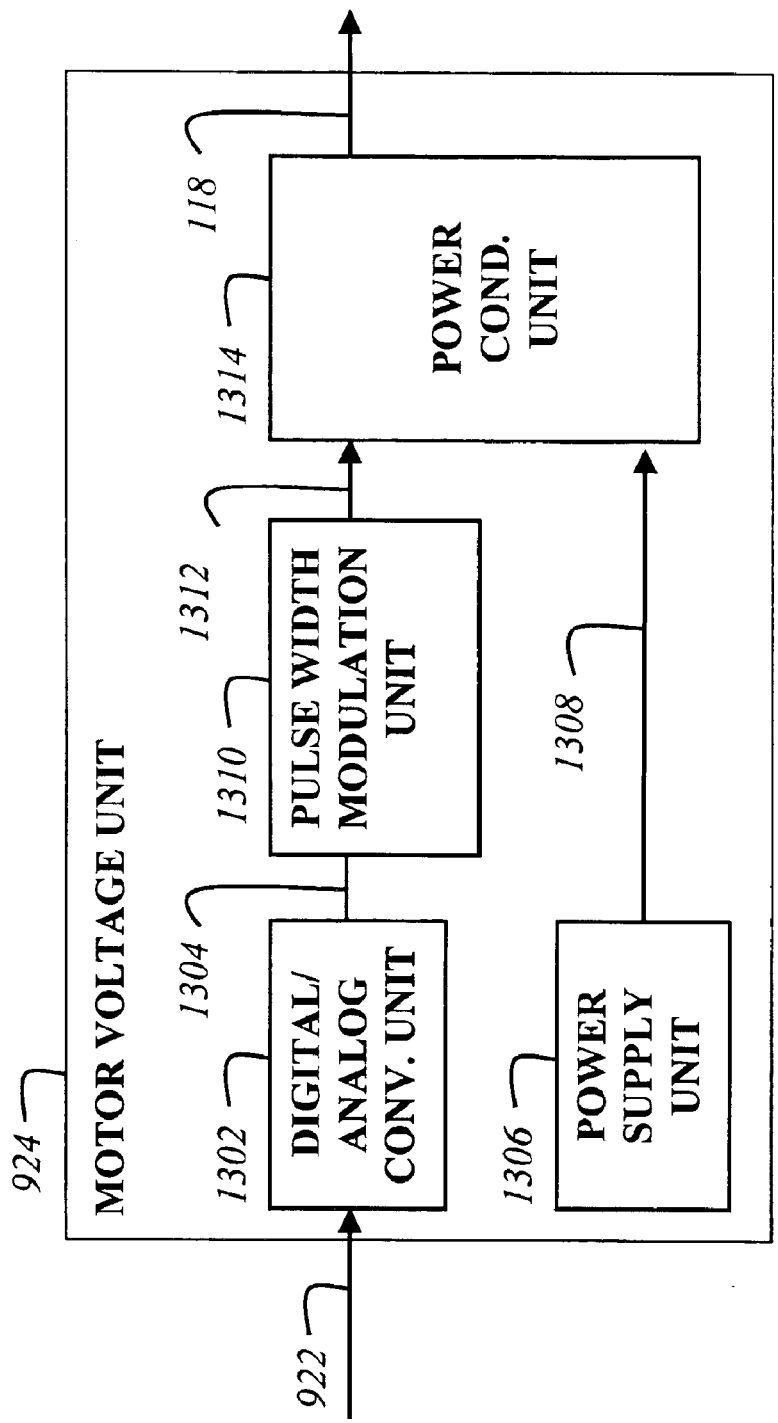
FIG. 13 shows the sub-blocks of the control unit comprising the motor voltage unit in accordance with an embodiment of the present invention.

In reference to FIG. 13, the motor voltage unit 924 includes a digital-to-analog conversion (DAC) unit 1302, a power supply unit 1306, a pulse width modulation unit 1310, and a power conditioning unit 1314. The digital-to-analog conversion (DAC) unit 1302 receives the scaled duty cycle command signal 922 and produces an analog scaled duty cycle command signal 1304. The pulse width modulation unit 1310 receives the analog scaled duty cycle command signal 1304 and produces a pulse width modulation signal 1312. The power supply unit 1306 produces a voltage supply signal 1308. The power conditioning unit 1314 receives the pulse width modulation signal 1312 and, the voltage supply signal 1308 and produces the outflow control signal 118.

The cabin pressure control method and apparatus of this specification is not considered to be a complete cabin pressure control system for providing all of the functions necessary to certify an aircraft or to provide safe pressurization. The scope of this invention is intended to include the control method specified herein and the system elements required to accomplish this control. Thus, this invention recognizes that additional system functions are necessary to provide a complete pressurization system, including but not limited to elements to provide independent positive pressure relief, negative pressure relief, cabin altitude limiting, specific indications, warnings, etc.

Figure 14:
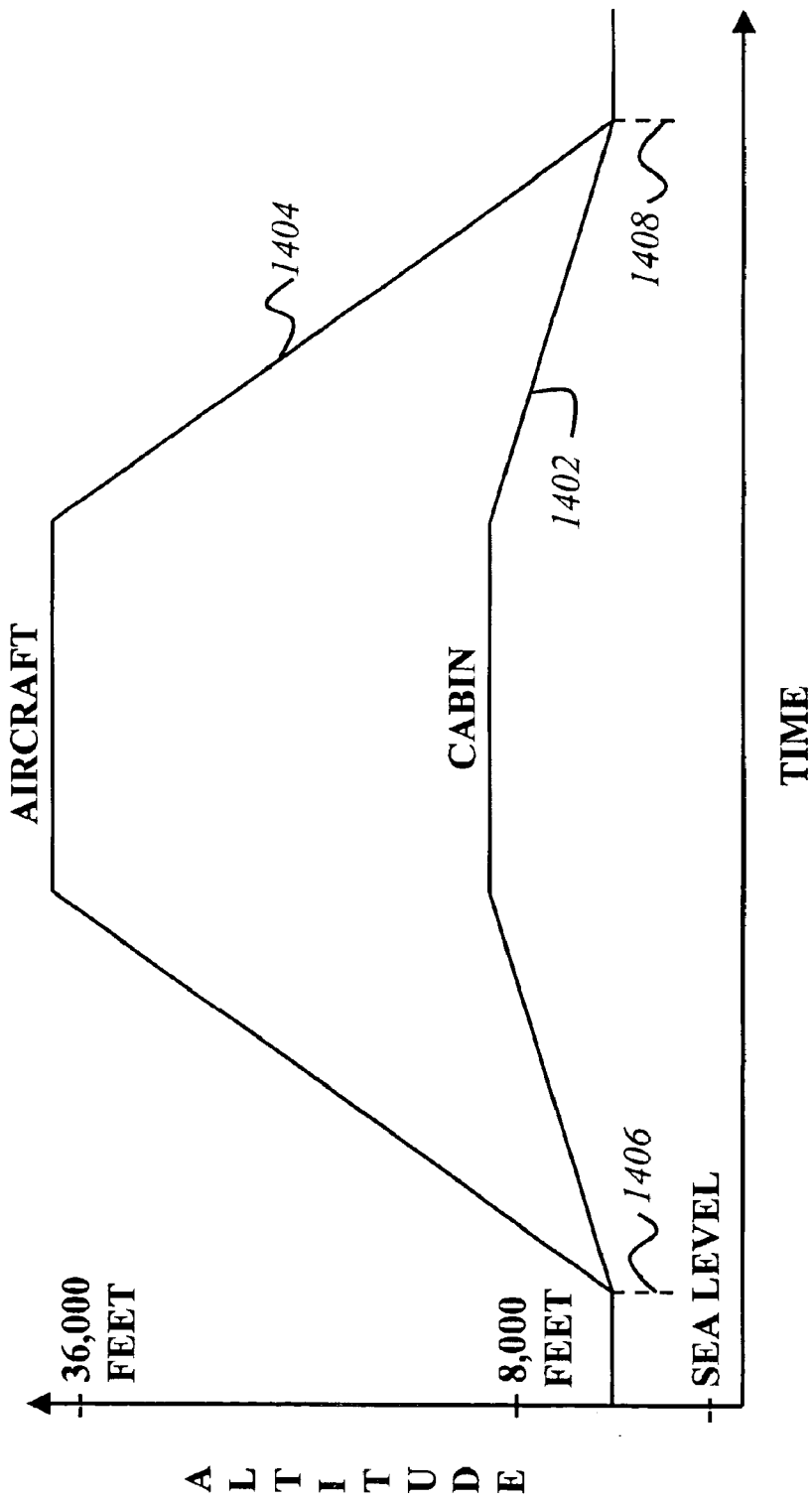
FIG. 14 shows an example cabin pressurization profile in reference to the actual altitude of the aircraft in accordance with an embodiment of the present invention.

FIG. 14 shows an example cabin pressurization profile 1402 in reference to the actual altitude of the aircraft 1404 between take-off 1406 and landing 1408. In this example, although the actual altitude of the cabin rises to about 36,000 feet, the pressurization of the cabin affords a maximum effective altitude of only about 8,000 feet to occupants in the cabin. Thus, the cabin occupants are able to enjoy a safe and comfortable environment while the actual ambient environment outside the pressurized cabin 102 would not he habitable. The mode logic described previously defines the operational parameters of the pressure control system 100.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. A pressure control system having an inflow unit for admitting pressurized air into a cabin of an aircraft and for regulating the air pressure within the cabin, comprising:

an outflow unit including a motor for operating a valve for controllably discharging the pressurized air from the cabin at a specified rate, the outflow unit receiving a motor control signal that sets the speed of the motor in a forward or reverse direction to incrementally open or close the valve at a corresponding valve speed, the valve assuming a corresponding valve position to discharge air from the cabin at the specified rate;

a first air pressure sensor disposed within the cabin for determining a cabin pressure level signal representing the air pressure within the cabin;

a second air pressure sensor disposed outside the cabin for determining an ambient pressure level signal representing the air pressure outside the cabin; and a control unit coupled to receive the cabin pressure level signal and the ambient pressure level signal and operable, in response thereto, to (i) compute a cabin pressure level rate of change signal based on the cabin pressure level signal, (ii) compute a commanded pressure level signal based at least in part on the ambient pressure level signal, (iii) compute a commanded pressure level rate of change signal based on the commanded pressure level signal end the cabin pressure level signal, (iv) compare the cabin pressure level rate of change signal with the commanded pressure level rate of change signal to thereby determine a cabin pressure rate of change error signal, and (v) generate the motor control signal based on the cabin pressure rate of change error signal, wherein the outflow unit, the first air pressure sensor, and the control unit are coupled together to form a feedback control loop having an operating point, the operating point of the feedback control loop being determined independently from the motor speed, the valve speed, end the valve position feedback.

2. The pressure control system of claim 1, wherein the feedback control loop includes all electrical components.

3. The pressure control system of claim 1, further comprising:
a user interface unit for receiving commands from a user and for outputting a user command signal to determine one of a manual and an automatic operation of the pressure control system.

4. The pressure control system of claim 1, wherein the outflow unit further comprises:
an outflow valve assembly including a duct being defined by a bore and a cross-sectional area, the bore being substantially parallel to the long axis of the duct and can be closed by a circular plate attached to an outflow valve rotating member disposed across a cross-sectional diameter of the bore comprising a butterfly outflow valve assembly, the butterfly outflow valve assembly being opened when the outflow valve rotating member rotates in a first direction to a point up to and including where the cross-sectional area of the bore being obstructed by the circular plate profile is minimum, the butterfly outflow valve being closed when the butterfly outflow valve rotating member rotates in a second direction to a point up to and including where the cross-sectional area of the bore being obstructed by the circular plate profile is maximum; and
a rotary electromechanical actuator for operating the butterfly outflow valve rotating member in the first, direction and second direction,
wherein the outflow unit rotary electromechanical actuator receives a motor control signal for alternatively opening and closing the outflow valve so as to enable discharging the pressurized air at a predetermined rate.

5. The pressure control system of claim 4,
wherein the rotary electromechanical actuator includes a second electric motor for operating the outflow valve.

6. The pressure control system of claim 5,
wherein one of the electric motor and the second electric motor is a brushed direct-current (DC) so that the one off the electric motor and the second electric motor self commutates.

7. The pressure control system of claim 5,
wherein one of the electric motor and the second electric motor is an alternating-current (AC) motor and includes a capacitor disposed to electrically connect the motor windings so that the one of the electric motor and the second electric motor self-commutates.

8. The pressure control system of claim 1, wherein the control unit comprises:
an automatic control channel for determining the command pressure level signal automatically based on mode logic AND environmental parameters; and
a manual control channel for manually operating the outflow unit according to user commands received by the user interface unit.

9. A pressure control system for regulating the air pressure within a cabin of an aircraft, comprising:
an inflow unit for supplying pressurized air into a cabin;
an outflow unit including a motor for operating a valve for controllably discharging the pressurised air from the cabin at a specified rate, the outflow unit receiving a motor control signal that sets the speed of the motor in a forward or reverse direction to incrementally open or close the valve at a corresponding valve speed, the valve assuming a corresponding valve position to discharge air from the cabin at the specified rate;
a first air pressure sensor disposed within the cabin for determining a cabin pressure level signal representing the air pressure within the cabin;
a second air pressure sensor disposed outside the cabin for determining an ambient pressure level signal representing the air pressure outside the cabin;
a user interface unit for receiving commands from a user and for outputting a user command signal to determine one of a manual and an automatic operation of the pressure control system; and
a control unit for receiving the cabin pressure level signal and computing a cabin pressure level rate of change signal, for receiving the ambient pressure level signal, the user command signal, and an aircraft inputs signal for computing a commanded pressure level signal and a commanded pressure level rate of change signal, the control unit for comparing the cabin pressure level rate of change signal with the commanded pressure level rate of change signal to determine a cabin pressure rate of change error signal, for generating the motor control signal based on the cabin pressure rate of change error signal,
wherein the outflow unit, the air pressure sensor, and the control unit are coupled together to form a feedback control loop having an operating point, the operating point of the feedback control loop being determined independently from the motor speed, the valve speed, and the valve position feedback.

10. The pressure control system of claim 9,
wherein the feedback control loop includes all electrical components.

11. The pressure control system of claim 9, the control unit including:
a mode logic unit for receiving the aircraft inputs signal, the ambient pressure level signal, the user command signal and computing a commanded pressure level signal based on aircraft operating conditions in reference to a cabin pressurization protocol.

12. The pressure control system of claim 9, wherein the control unit further comprises:
a sensor filter unit for receiving the cabin pressure level signal and outputting a filtered cabin pressure level signal;
a rate unit for receiving the filtered cabin pressure level signal and producing a sensed cabin pressure change rate;
a pressure command unit for receiving the filtered cabin pressure level signal, the sensed cabin pressure change rate signal, and a commanded pressure level signal and producing a pressure command signal;
a pneumatic compensation unit for receiving the pressure command signal and producing a pneumatic gain signal; and
a motor voltage unit for receiving the pneumatic gain signal and producing the outflow control signal.

13. The pressure control system of claim 12, the rate unit further comprising:
a rate amplifier unit for receiving a filtered cabin pressure level signal and produces an amplified filtered cabin pressure level signal;
an analog to digital conversion unit for receiving the filtered cabin pressure level signal and outputting a digitized pressure level signal; and
a scaling unit for receiving the digitized pressure level signal and producing a sensed cabin pressure change rate signal.

14. The pressure control system of claim 12, wherein the pressure command unit further comprises:
an analog to digital conversion unit for receiving a filtered cabin pressure level signal and producing a digital filtered cabin pressure level signal;
- a scaling unit for receiving the digital filtered cabin pressure level signal and producing a scaled filtered cabin pressure level signal;
- a first summing unit for subtracting the scaled filtered cabin pressure level signal from the commanded pressure level signal to produce a cabin pressure error signal; a compensation unit for receiving the cabin pressure error signal and producing a compensated cabin pressure error signal;
- a rate limiter unit for receiving the compensated cabin pressure error signal and producing a rate limited compensated cabin pressure error signal; an electronic DP rate command unit for producing an electronic DP rate command signal;
- a second summing unit for adding the rate limited compensated cabin pressure error signal to the electronic DP rate command signal and subtracting the sensed cabin pressure change rate signal to produce a pressure command signal.

15. The pressure control system of claim 12, wherein the pneumatic compensation unit further comprises:
- a pneumatic gain unit for producing a pneumatic gain signal;
- a gain multiplier unit receiving the pneumatic grain signal and the pressure command signal and producing a gain multiplier signal;
- a gain compensation unit for receiving the gain multiplier signal and producing a compensated gain multiplier signal; and
- a gain scaling unit for receiving the compensated gain multiplier signal and producing a pneumatic compensation signal.

16. The pressure control system of claim 12, wherein the motor voltage unit further comprises:
- a digital to analog conversion unit for receiving the pneumatic compensation signal and producing an analog pneumatics signal;
- a power supply unit for producing a voltage supply signal; and
- a pulse width modulation unit for receiving the analog pneumatic signal and producing a pulse width modulation signal; and
- a power conditioning unit for receiving the pulse width modulation signal and the voltage supply signal for producing the motor control signal.

17. A method of controlling air pressure within a cabin that includes an inflow unit for supplying pressurized air to the cabin, the method comprising:
- sensing the air pressure within a cabin to produce a cabin pressure level signal representing the air pressure within the cabin;
- computing a cabin pressure level rate of change signal from the cabin pressure level signal;
- sensing the air pressure outside the cabin to produce an ambient pressure level signal representing the air pressure outside the cabin;
- receiving an aircraft inputs signal indicating an aircraft operating condition, a user command signal indicating an operational mode, and the ambient pressure level signal;
- computing a commanded pressure level signal based on the aircraft inputs signal, the user command signal, and the ambient pressure level signal;
- computing a commanded pressure level rate of change signal from the commanded pressure level signal and the cabin pressure level signal;
- comparing the cabin pressure level rate of change signal with the commanded pressure level rate of change signal to determine a cabin pressure rate of change error signal; and
- outputting an outflow control signal to controllably discharge pressurized air from the cabin based on the cabin pressure rate of change error signal.

18. The method of claim 17,
wherein the cabin pressure level rate of change signal is determined by sampling every 5 milliseconds.

19. The method of claim 17,
wherein the commanded pressure level rate of change signal is determined by sampling every 50 milliseconds.

20. The method of claim 17,
wherein the cabin pressure rate of change error signal is determined by sampling every 5 milliseconds.

* * * * *